No. 826,641. PATENTED JULY 24, 1906.
P. WRIGHT.
FERTILIZER SPREADER.
APPLICATION FILED NOV. 13, 1905.

2 SHEETS—SHEET 1.

Witnesses
Fred. A. Duncan
J. A. Walsh

Inventor
Peter Wright
By
Bradford Hood
Attorneys

No. 826,641. PATENTED JULY 24, 1906.
P. WRIGHT.
FERTILIZER SPREADER.
APPLICATION FILED NOV. 13, 1905.

2 SHEETS—SHEET 2.

Witnesses
Fred. A. Duncan
J. A. Walsh

Inventor
Peter Wright
By
Bradford & Hood,
Attorneys

UNITED STATES PATENT OFFICE.

PETER WRIGHT, OF SAN JACINTO, INDIANA.

FERTILIZER-SPREADER.

No. 826,641.　　　Specification of Letters Patent.　　　Patented July 24, 1906.

Application filed November 13, 1905. Serial No. 287,058.

*To all whom it may concern:*

Be it known that I, PETER WRIGHT, a citizen of the United States, residing at San Jacinto, in the county of Jennings and State of Indiana, have invented certain new and useful Improvements in Fertilizer-Spreaders, of which the following is a specification.

In the ordinary type of fertilizer-spreaders, wherein the fertilizer is discharged from the rear end of the wagon-bed by means of a rotary drum the axis of which is parallel to the supporting-axles of the wagon, the space covered at any given travel of the wagon cannot exceed the width of the bed.

The object of my present invention is to produce a simple mechanism readily attachable to any ordinary fertilizer-spreader by means of which the fertilizer may be distributed over a strip of considerably greater width than the width of the wagon-bed.

The accompanying drawings illustrate my invention.

Figure 1:
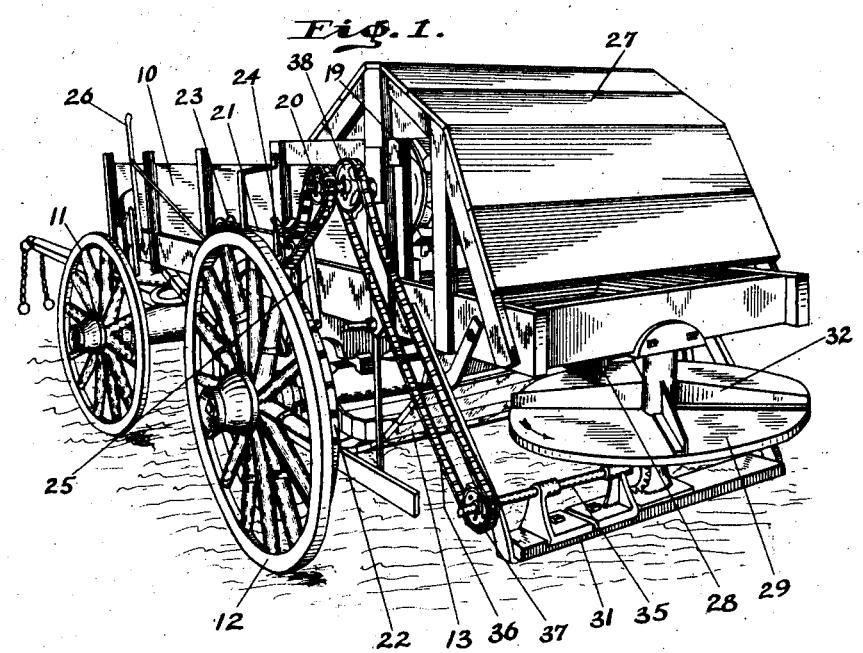
Figure 2:
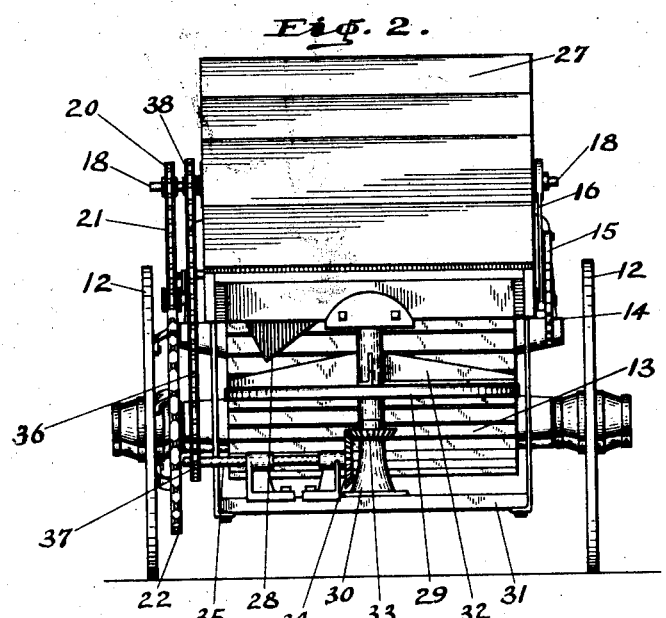
Figures 3, 4:
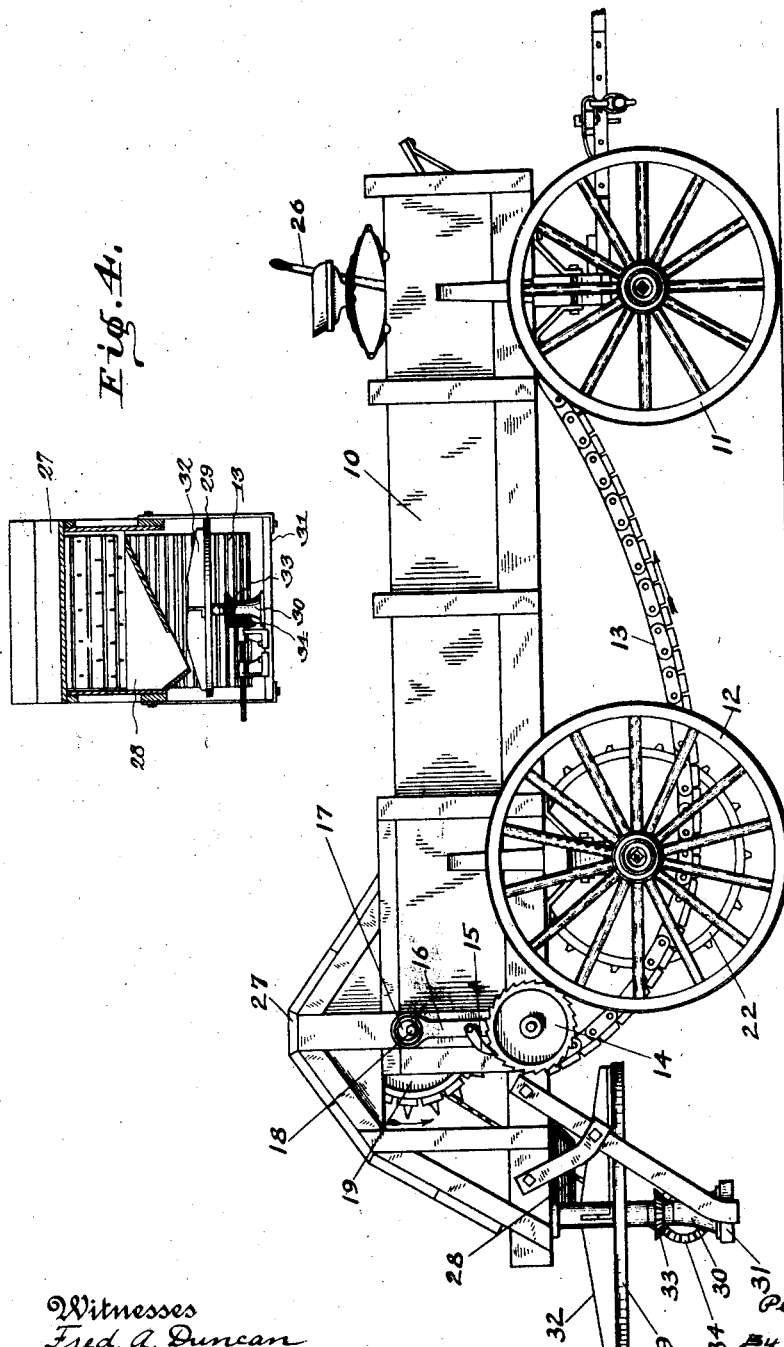

Figure 1 is a perspective view of the embodiment thereof; Fig. 2, an end elevation; Fig. 3, a side elevation, and Fig. 4 a vertical sectional detail through the throwing-wheel and chute leading thereto.

In the drawings, 10 indicates a suitable bed supported by front wheels 11 and rear wheels 12. The bottom of bed 10 is formed by an endless conveyer 13, which is automatically moved to the rear by any suitable means—such, for instance, as a ratchet-wheel 14 and pawl 15, the pawl being carried by an arm 16, which is reciprocated by means of an eccentric 17, carried by the shaft 18 of the feed-drum 19, which feed-drum is arranged at the open rear end of the bed 10 immediately above the belt 13. The shaft 18 may be driven by any suitable means in the direction indicated by the arrows, so as to engage the mass of fertilizer on the bottom 13 and carry the same up over the drum and discharge it to the rear. The drum 19 may be rotated in any desirable manner. In the drawings I have shown a common means of rotating the drum, said means consisting of a sprocket-wheel 20, attached to shaft 18, and a sprocket-chain 21, passed over said sprocket-wheel 20 and adapted to be brought into engagement with a sprocket-wheel 22, attached to one of the rear wheels 12. In the drawings the chain 21 is shown as carried over a pair of idlers 23 and 24, the idler 24 being carried by an arm 25, which is pivoted to the wagon-bed and may be swung by means of a hand-lever 26 so as to throw the chain 21 into and out of engagement with the sprocket-wheel 22, so as to stop the rotation of the drum 19 at any time.

The drum 19 is preferably covered by a hood 27, which leads downward to a hopper 28, into which the fertilizer is discharged and from which it flows onto the upper surface of a throwing-wheel 29, which is journaled upon a suitable vertical standard 30, arranged beneath the hopper and supported by a suitable cross-beam 21, attached to the wagon-bed. Table 39 is provided on its upper face with radial ribs 32, which are adapted to engage the fertilizer and throw the same radially from the face of the wheel. Wheel 29 is rotated by any suitable means—as, for instance, a gear 33, attached to the under side of a wheel and meshing with a gear 34, carried by a shaft 35, journaled on the bar 31 and driven by means of a chain 36, passing over a sprocket-wheel 37, attached to shaft 35, and a sprocket-wheel 38, attached to the shaft 18.

In operation the wagon-bed 10 is filled with a supply of fertilizer and driven to the desired point of distribution, the chain 21 being held out of engagement with the sprocket 22. When the desired point is reached, chain 21 is thrown down into engagement with the sprocket 22, whereupon drum 19 is rotated in the direction indicated by the arrow and the bed 13 is gradually fed to the rear. The fertilizer engaged by drum 19 is carried up over the same and deposited in a hopper 28, from whence it flows over the upper face of the throwing-wheel 29, which is rotated rapidly in the direction indicated by the arrow. So soon as the fertilizer drops upon the face of the throwing-wheel it is engaged by the radial arms 32 and by them thrown radially to a considerable distance, thus distributing the fertilizer over a strip the width of which is very considerably greater than the width of the wagon-bed. By this means I am able to distribute fertilizer over an entire field in much fewer trips than would be possible with the ordinary construction.

I claim as my invention—

1. The combination, with a suitable vehicle, of a feed-drum journaled at the rear thereof, means for driving said feed-drum, a throwing-wheel journaled on the vehicle to rotate in a substantially horizontal plane beneath and to the rear of the feed-drum, a delivery-hood covering the feed-drum and extending to a chute, and the said chute, delivering to the rearwardly-moving side of the throwing-wheel, substantially as and for the purpose set forth.

2. The combination, with a suitable vehicle having an endless-belt bottom, of means for driving said bottom to the rear, a feed-drum journaled above said bottom at the rear, means for driving said feed-drum, a throwing-wheel journaled on the vehicle to rotate in a substantially horizontal plane beneath and to the rear of the feed-drum, a delivery-hood covering the feed-drum and extending to a chute, and the said chute, delivering to the rearwardly-moving side of the throwing-wheel, substantially as and for the purpose set forth.

In witness whereof I have hereunto set my hand and seal, at San Jacinto, Indiana, this 6th day of November, A. D. 1905.

PETER WRIGHT. [L. S.]

Witnesses:
 MARY E. MILES,
 CHARLES W. MILES.